United States Patent
Ikeda

(10) Patent No.: US 10,508,933 B2
(45) Date of Patent: Dec. 17, 2019

(54) COMPOSITE DETECTION SENSOR AND SENSOR CABLE

(71) Applicant: Hitachi Metals, Ltd., Tokyo (JP)

(72) Inventor: Yukio Ikeda, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 78 days.

(21) Appl. No.: 15/869,703

(22) Filed: Jan. 12, 2018

(65) Prior Publication Data
US 2018/0216969 A1 Aug. 2, 2018

(30) Foreign Application Priority Data
Jan. 27, 2017 (JP) .................................. 2017-012893

(51) Int. Cl.
| | | |
|---|---|---|
| *G01D 5/24* | (2006.01) | |
| *G01D 11/24* | (2006.01) | |
| *G01D 5/241* | (2006.01) | |
| *G01L 1/14* | (2006.01) | |

(52) U.S. Cl.
CPC ............ *G01D 5/24* (2013.01); *G01D 5/2417* (2013.01); *G01D 11/245* (2013.01); *G01L 1/144* (2013.01)

(58) Field of Classification Search
CPC ...... G01D 5/24; G01D 5/2417; G01D 11/245; G01L 1/142
See application file for complete search history.

(56) References Cited

U.S. PATENT DOCUMENTS

| | | | | |
|---|---|---|---|---|
| 5,220,130 A | * | 6/1993 | Walters | H01B 11/1839 174/113 R |
| 8,970,232 B2 | * | 3/2015 | Kandler | B60N 2/002 324/660 |
| 9,472,320 B2 | * | 10/2016 | Lundgren | H01B 7/20 |
| 9,941,030 B2 | * | 4/2018 | Williamson | H01B 7/182 |
| 2007/0117445 A1 | * | 5/2007 | Yamaura | H03K 17/962 439/404 |

(Continued)

FOREIGN PATENT DOCUMENTS

| | | | |
|---|---|---|---|
| JP | 2013-015976 A | 1/2013 | |
| WO | WO-2014147833 A1 * | 9/2014 | ............... G01B 7/22 |

*Primary Examiner* — Dominic E Hawkins
(74) *Attorney, Agent, or Firm* — McGinn IP Law Group, PLLC

(57) ABSTRACT

A composite detection sensor includes a sensor cable including not less than three conductive electrode wires and a resilient insulation covering collectively the electrode wires and holding the electrode wires that are circumferentially spaced from each other, and a capacitance measurement unit for measuring capacitance between each two electrode wires and between each electrode wire and the ground. The capacitance measurement unit may include plural inter-wire capacitance measuring portions for measuring capacitance between the electrode wires, a wire-ground capacitance measuring portion for measuring capacitance between the electrode wires and the ground, and a switching means switchable between a first connection state and a second connection state, the first connection state being a state in which the electrode wires are connected to the inter-wire capacitance measuring portions, and the second connection state being a state in which the electrode wires are connected to the wire-ground capacitance measuring portion.

14 Claims, 5 Drawing Sheets

(56) References Cited

U.S. PATENT DOCUMENTS

| | | | |
|---|---|---|---|
| 2011/0185819 A1* | 8/2011 | Hattori | E05F 15/44 73/753 |
| 2015/0145500 A1* | 5/2015 | Oshima | G01R 21/133 324/76.77 |
| 2016/0139181 A1* | 5/2016 | Gravermann | G01R 19/0084 324/686 |
| 2017/0265594 A1* | 9/2017 | Walker | A43B 3/001 |

\* cited by examiner

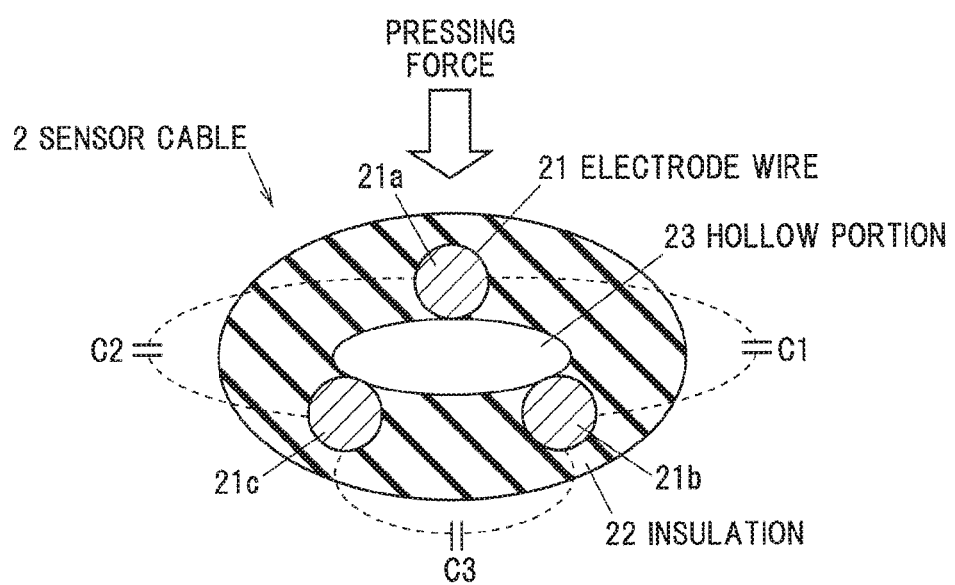

COMPOSITE DETECTION SENSOR AND SENSOR CABLE

The present application is based on Japanese patent application No. 2017-012893 filed on Jan. 27, 2017, the entire contents of which are incorporated herein by reference.

BACKGROUND OF THE INVENTION

1. Field of the Invention

The invention relates to a composite detection sensor and a sensor cable used for the composite detection sensor.

2. Description of the Related Art

JP 2013/15976A discloses a composite detection sensor for sensing an approach of a portion of human body (e.g., a finger) and sensing a pressure applied thereto.

The composite detection sensor disclosed in JP 2013/15976A is constructed such that a sensor portion thereof has plural plate-shaped electrodes laminated via dielectrics so as to sense an approach of an object such as human based on change in capacitance between the electrodes and the ground as well as a pressure applied to the sensor portion based on change in capacitance between the electrodes.

SUMMARY OF THE INVENTION

The composite detection sensor disclosed in JP 2013/15976A may be difficult to apply to a curved portion such as a steering wheel (i.e., the sensor portion may be difficult to install along a curved surface) since the electrodes are plate-shaped.

It is an object of the invention to provide a composite detection sensor that allows easy application to a curved portion, as well as a sensor cable used for the composite detection sensor.

According to one embodiment of the invention, a composite detection sensor comprises:

a sensor cable comprising not less than three conductive electrode wires and a resilient insulation covering collectively the not less than three electrode wires and holding the electrode wires that are circumferentially spaced from each other; and a capacitance measurement unit for measuring capacitance between each two electrode wires and between at least one of the electrode wires and the ground.

According to another embodiment of the invention, a sensor cable comprises:

not less than three conductive electrode wires; and a resilient insulation covering collectively the not less than three electrode wires and holding the electrode wires that are circumferentially spaced from each other, wherein no outer conductor is provided around the electrode wires.

Effects of the Invention

According to an embodiment of the invention, a composite detection sensor can be provided that allows easy application to a curved portion, as well as a sensor cable used for the composite detection sensor.

BRIEF DESCRIPTION OF THE DRAWINGS

Next, the present invention will be explained in more detail in conjunction with appended drawings, wherein:

FIG. 4 is a cross sectional view showing the sensor cable which is pressed; and

DETAILED DESCRIPTION OF THE PREFERRED EMBODIMENTS

Embodiment

An embodiment of the invention will be described below in conjunction with the appended drawings.

Figure 1A:
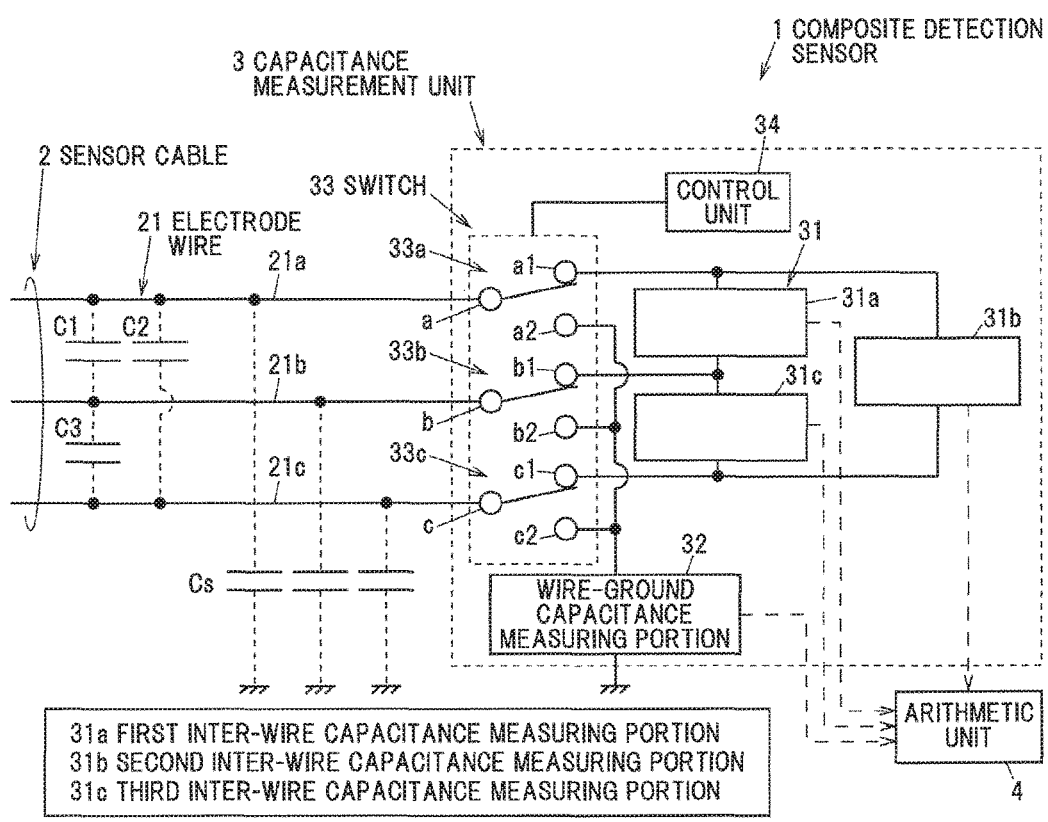
FIG. 1A is a schematic configuration diagram illustrating a composite detection sensor in an embodiment of the present invention.
Figure 1B:
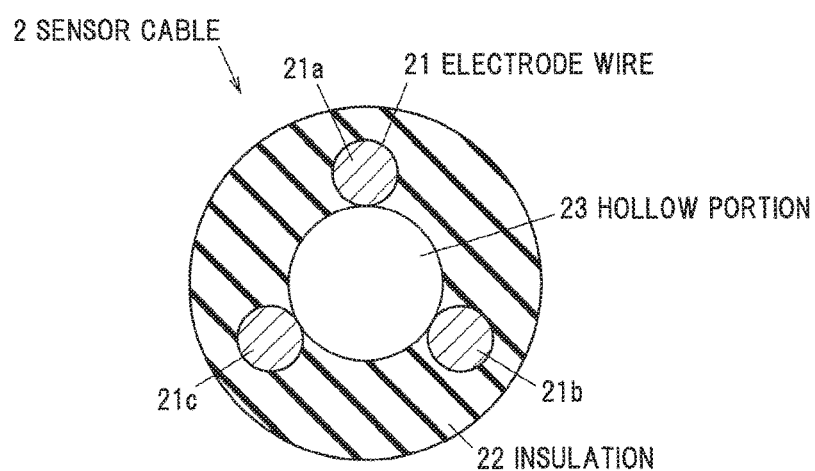
FIG. 1B is a cross sectional view showing a sensor cable taken perpendicular to the longitudinal direction thereof.

FIG. 1A is a schematic configuration diagram illustrating a composite detection sensor in the present embodiment and FIG. 1B is a cross sectional view showing a sensor cable taken perpendicular to the longitudinal direction thereof As shown in FIGS. 1A and 1B, a composite detection sensor 1 is provided with a sensor cable 2, a capacitance measurement unit 3 and an arithmetic unit 4.

Description of the Sensor Cable 2

The sensor cable 2 has not less than three conductive electrode wires 21 and a resilient insulation 22 covering collectively the not less than three electrode wires 21 and holding electrode wires 21 which are circumferentially spaced from each other.

Although the sensor cable 2 having three electrode wires 21, which are a first electrode wire 21a, a second electrode wire 21b and a third electrode wire 21c, will be described in this example, the number of the electrode wires 21 may be four or more. In the present embodiment, pressure applied to the sensor cable 2 (deformation of the sensor cable 2 due to pressure) is sensed by measuring capacitance between the electrode wires 21 (the details will be described later). In case of using two electrode wires 21, a distance between the electrode wires 21 may not change, hence no change in capacitance therebetween, when the sensor cable 2 is pressed in a direction perpendicular to a direction in which the two electrode wires 21 face each other. That is, when there are two electrode wires 21, applied pressure may not be sensed in some directions. Therefore, in the present embodiment, not less than three electrode wires 21 are used to prevent from having directions in which applied pressure cannot be sensed.

The electrode wires 21 are arranged at equal intervals in a circumferential direction of the sensor cable 2. In addition, the electrode wires 21 are arranged in a helical manner along the longitudinal direction of the sensor cable 2. By helically arranging the electrode wires 21, it is possible to obtain a large change in capacitance even when, e.g., a pressed area is small, thereby improving sensitivity for sensing the pressure applied to the sensor cable 2. However, helical arrangement of the electrode wires 21 is not essential and the electrode wires 21 may be arranged, e.g., in parallel to each other along the longitudinal direction of the sensor cable 2.

In the present embodiment, a winding pitch of the electrode wires 21 (a distance along the longitudinal direction of the sensor cable 2 from a given point to a point at which the electrode wire 21 wound one turn around the central axis of the sensor cable 2 is located the same circumferential position) can be appropriately determined depending on an outer diameter of the electrode wire 21, an outer diameter of the entire sensor cable 2, and the required sensitivity, etc. In this example, the outer diameter of the entire sensor cable 2 is 5 mm and the winding pitch of the electrode wires 21 is 30 mm.

The electrode wire 21 only needs to be a conductive linear member and can be, e.g., an insulated wire, such as enameled wire, having a stranded conductor formed by twisting soft copper strands and an insulation layer formed on the surface of the conductor, or a conductive resin or conductive rubber formed by mixing a conductive filler with a resin or rubber so as to have a low resistance.

In the present embodiment, when measuring capacitance between the electrode wires 21, AC voltage is applied between the electrode wires 21. In the sensor cable 2, the electrode wires 21 come into direct contact with each other. Therefore, when an insulated wire such as enameled wire is used as the electrode wire 21, short-circuit is prevented even when the electrode wires 21 come into direct contact with each other due to the pressure applied to the sensor cable 2, and it is thus possible to omit a protective circuit for protecting the capacitance measurement unit 3 in the event of short-circuit.

The insulation 22 holds the electrode wires 21 so that the electrode wires 21 partially or entirely embedded and not electrically in contact with each other are fixed in a helical shape. The insulation 22 is formed of a material which easily deforms under an external force applied due to contact with an object, etc., and immediately returns to the original shape upon removal of the external force. Such material which can be used here is a resilient rubber, a resilient plastic or an elastomer, etc.

In the present embodiment, the insulation 22 has a hollow portion 23 and is formed in a hollow cylindrical shape. Providing the hollow portion 23 in the insulation 22 causes the sensor cable 2 to be likely to deform (likely to be squashed) under an external force and thus distances (capacitance) between the electrode wires 21 to be likely to change even with a small external force, which improves sensitivity for sensing pressure applied to the sensor cable 2.

Figure 2A:
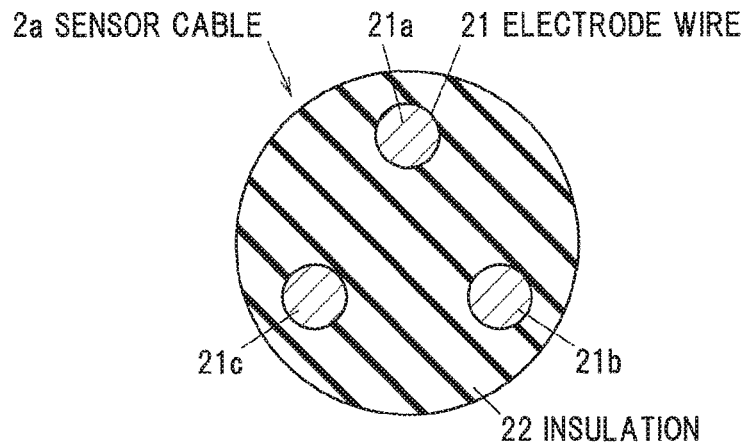
FIGS. 2A to 2C are cross sectional views showing modifications of the sensor cable.
Figure 2B:
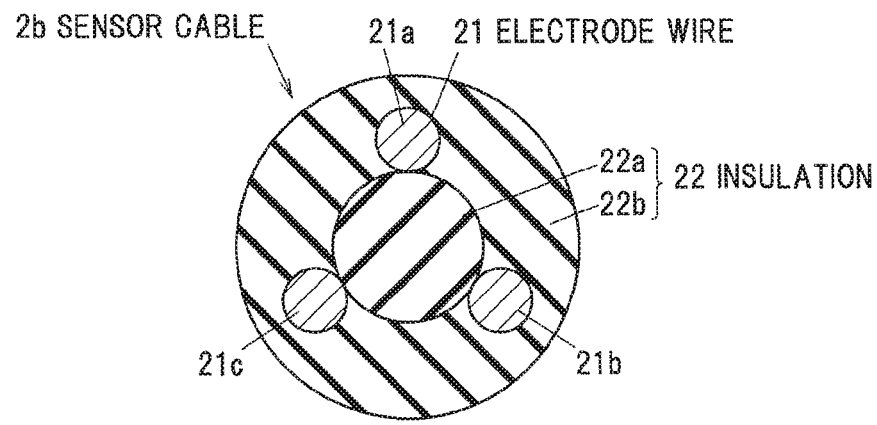

However, the configuration of the insulation 22 is not limited thereto. The insulation 22 may not have the hollow portion 23 as is in a sensor cable 2a shown in FIG. 2A, or the insulation 22 may have a multilayer structure composed of a linear first insulation 22a and a second insulation 22b covering the outer surface of the first insulation 22a and having a higher rigidity than the first insulation 22a as is in a sensor cable 2b shown in FIG. 2B. By not providing the hollow portion 23 in the insulation 22, it is possible to prevent buckling of the sensor cable 2 when the sensor cable 2 is bent and arranged. Meanwhile, when the insulation 22 has a multilayer structure as shown in FIG. 2B so that the inner side has a lower rigidity (i.e., more deformable), it is possible to realize the sensor cable 2 which is less likely to buckle while improving sensitivity for sensing pressure applied to the sensor cable 2.

Figure 2C:
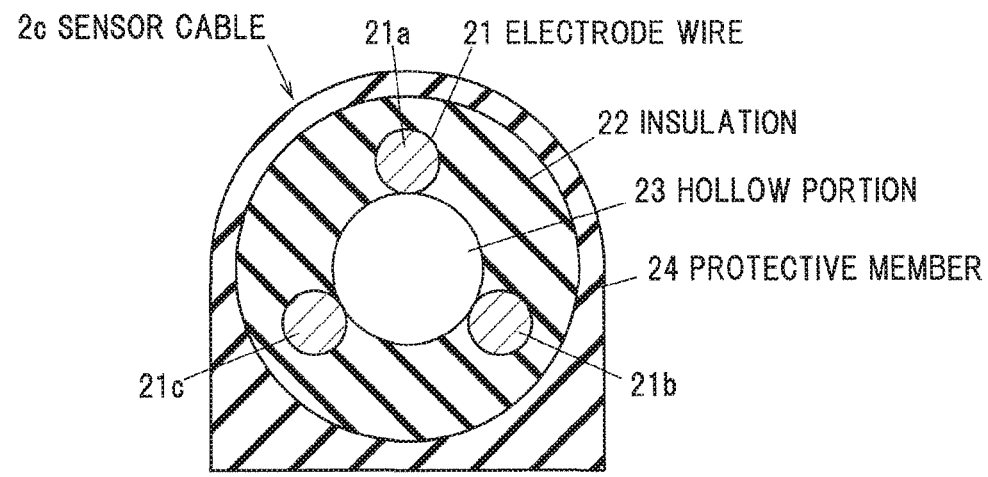

Alternatively, the sensor cable 2 may further have a protective member 24 covering the outer surface of the insulation 22 as is in a sensor cable 2c shown in FIG. 2C. The protective member 24 is formed of a non-conductive resin or rubber, etc., which is easily deformable under an applied external force. The protective member 24 shown in FIG. 2C has a flat surface 24a at a portion of the outer surface to facilitate installation of the sensor cable 2. That is, the protective member 24 of the sensor cable 2 is a member which serves to protect the insulation 22 and also to facilitate installation of the sensor cable 2.

The composite detection sensor 1 in the present embodiment measures capacitance between each electrode wire 21 and the ground and senses an approach of an object such as hand to the sensor cable 2 based on the measured capacitance (the details will be described later). For this reason, the sensor cable 2 does not have conductors (outer conductors) around the electrode wires 21.

Description of the Capacitance Measurement Unit 3

The capacitance measurement unit 3 measures capacitance between each two electrode wires 21 and capacitance between each electrode wire 21 and the ground (earth).

In the present embodiment, the capacitance measurement unit 3 is provided with plural inter-wire capacitance measuring portions 31, a wire-ground capacitance measuring portion 32 and a switch 33 as a switching means.

The inter-wire capacitance measuring portions 31 are provided to measure capacitance between the electrode wires 21. The inter-wire capacitance measuring portions 31 in this example are a first inter-wire capacitance measuring portion 31a for measuring capacitance C1 between the first electrode wire 21a and the second electrode wire 21b, a second inter-wire capacitance measuring portion 31b for measuring capacitance C2 between the third electrode wire 21c and the first electrode wire 21a, and a third inter-wire capacitance measuring portion 31c for measuring capacitance C3 between the second electrode wire 21b and the third electrode wire 21c.

The wire-ground capacitance measuring portion 32 measures capacitance between each electrode wire 21 and the ground. Specific circuit configurations of the inter-wire capacitance measuring portion 31 and the wire-ground capacitance measuring portion 32 and the method of obtaining capacitance are not specifically limited.

The switch 33 as a switching means has a first switch 33a, a second switch 33b and a third switch 33c which operate in conjunction with each other. The first switch 33a has a common terminal a, a first terminal a1 and a second terminal a2, and is configured to be capable of switching connection between the common terminal a with the first terminal a1 and the common terminal a with the second terminal a2. The second switch 33b has a common terminal b, a first terminal b1 and a second terminal b2, and is configured to be capable of switching connection between the common terminal b with the first terminal b1 and the common terminal b with the second terminal b2. Likewise, the third switch 33c has a common terminal c, a first terminal c1 and a second terminal c2, and is configured to be capable of switching connection between the common terminal c with the first terminal c1 and the common terminal c with the second terminal c2.

An end (proximal end) of the first electrode wire 21a is connected to the common terminal a of the first switch 33a. An end (proximal end) of the second electrode wire 21b is connected to the common terminal b of the second switch 33b. Likewise, an end (proximal end) of the third electrode wire 21c is connected to the common terminal c of the third switch 33c. The other end (tip) of each of the first to third electrode wires 21a to 21c is an open end.

The first inter-wire capacitance measuring portion 31a is provided between the first terminal a1 of the first switch 33a and the first terminal b1 of the second switch 33b. The second inter-wire capacitance measuring portion 31b is provided between the first terminal a1 of the first switch 33a and the first terminal c1 of the third switch 33c. The third inter-wire capacitance measuring portion 31c is provided between the first terminal b1 of the second switch 33b and the first terminal c1 of the third switch 33c. The second terminals a2, b2 and c2 of the switches 33a, 33b and 33c are grounded through the wire-ground capacitance measuring portion 32.

Figure 3A:
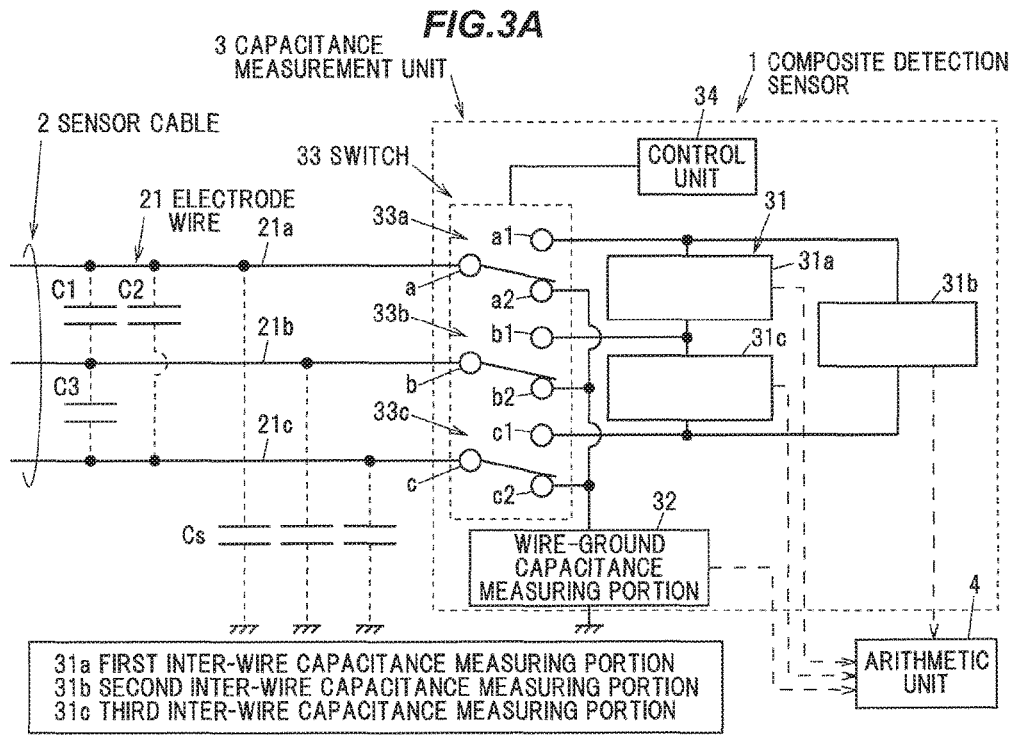
FIG. 3A is a diagram illustrating the composite detection sensor when a switch is in a second connection state.
Figure 3B:
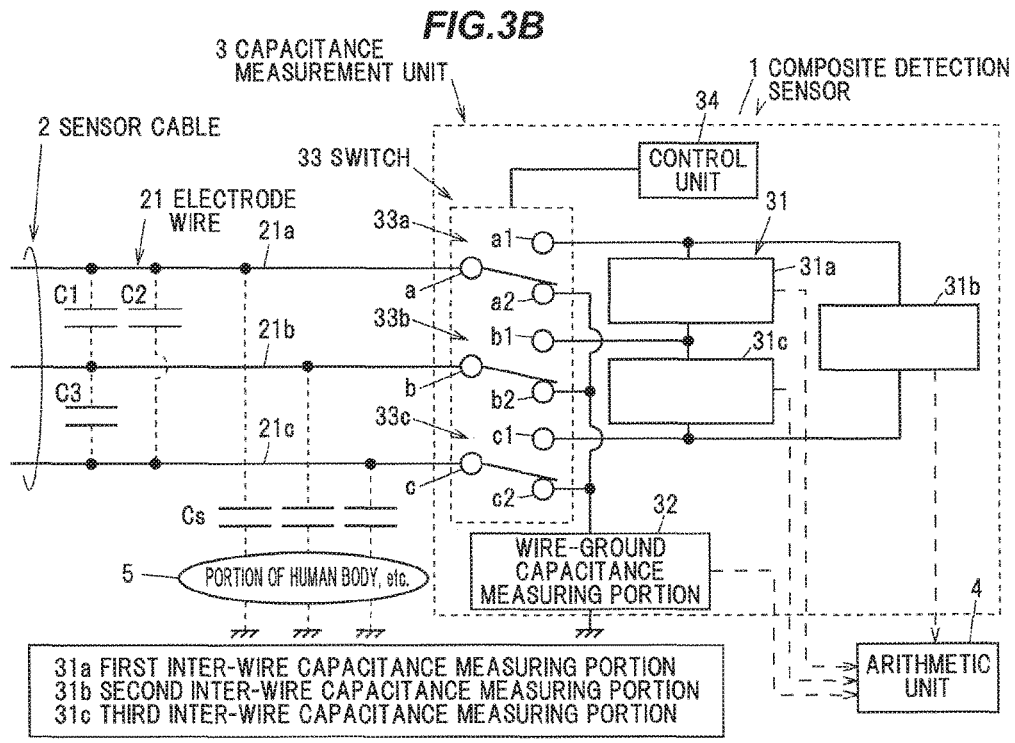
FIG. 3B is a diagram illustrating the second connection state when a portion of human body, etc., is approaching.

The switch 33 is configured to be switchable between a first connection state and a second connection state, where the common terminals a, b and c are respectively connected to the first terminals a1, b1 and c1 and the electrode wires 21 are connected to the inter-wire capacitance measuring portions 31a to 31c in the first connection state (see FIG. 1A), and the common terminals a, b and c are respectively connected to the second terminals a2, b2 and c2 and the electrode wires 21 are connected to the wire-ground capacitance measuring portion 32 in the second connection state (see FIGS. 3A and 3B).

In addition, in the present embodiment, the switch 33 is configured such that all the electrode wires 21a to 21c are collectively connected to the shared wire-ground capacitance measuring portion 32 when switched to the second connection state. In other words, the wire-ground capacitance measuring portion 32 of the composite detection sensor 1 is configured to measure capacitance between all the electrode wires 21a to 21c and the ground.

It could be considered that, e.g., only one of the three electrode wires 21 is connected to the wire-ground capacitance measuring portion 32 and the inter-wire capacitance measuring portion 31 is used to measure capacitance between the remaining two electrode wires 21. In this case, however, two measurements when conducted simultaneously may influence each other, causing a decrease in detection accuracy. In addition, it is considered that sensitivity for detecting an approaching object is better and the detection is more stable when using plural electrode wires 21 than when using only one electrode wire 21. Therefore, in the present embodiment, all the electrode wires 21a to 21c are collectively connected to the wire-ground capacitance measuring portion 32 when switched to the second connection state.

The capacitance measurement unit 3 also has a control unit 34 for controlling the switch 33. In the present embodiment, the control unit 34 is configured to switch between the first connection state and the second connection state for every predetermined time.

When using the composite detection sensor 1 in the present embodiment, for example, the sensor cable 2 is attached to, e.g., a steering wheel to detect whether or not a driver is gripping the steering wheel or whether or not the driver is performing a switching operation by pressing the sensor cable 2 (the details will be described later). When used in such application, sufficient performance may not be exerted if the switching time interval is too long. Therefore, when the composite detection sensor 1 is used in such application, the desirable time interval (the above-mentioned predetermined time) for switching between the first connection state and the second connection state by the control unit 34 is less than 1 second, preferably not more than 500 ms, more preferably not more than 200 ms. In the present embodiment, the time interval is set to 100 ms.

In this regard, the time interval for switching between the first connection state and the second connection state by the control unit 34 does not need to be fixed, and may be changed according to the usage condition. In addition, time for keeping the first connection state may be different from time for keeping the second connection state. For example, in a state that contact of an object such as a part of human body with the sensor cable 2 is being detected by the arithmetic unit 4 (described later), the first connection state may be kept for long time and the second connection state for short time. This allows for prompt detection of pressure applied to the sensor cable 2.

Description of the Arithmetic Unit 4

The arithmetic unit 4 detects whether or not the sensor cable 2 is pressed (referred to as "pressure detection") and whether or not an object such as a part of human body is approaching (close to) the sensor cable 2 (referred to as "approach detection"), based on the capacitance measured by the inter-wire capacitance measuring portions 31 or the wire-ground capacitance measuring portion 32.

Firstly, the approach detection will be described. When the switch 33 is in the second connection state shown in FIG. 3A and an object such as a part of human body is not close to the sensor cable 2, capacitance Cs between the electrode wire 21 and the ground measured by the wire-ground capacitance measuring portion 32 has a substantially constant value.

On the other hand, when an object 5 such as a part of human body approaches the sensor cable 2 as shown in FIG. 3B, the capacitance Cs between the electrode wire 21 and the ground measured by the wire-ground capacitance measuring portion 32 changes. The arithmetic unit 4 senses an approach of an object to the sensor cable 2 based on variation of the capacitance Cs.

For example, the arithmetic unit 4 detects variation $\Delta Cs$ of the capacitance Cs and determines that the object 5 such as a part of human body is close to the sensor cable 2 when the variation $\Delta Cs$ exceeds a preset approach determination threshold. Alternatively, the arithmetic unit 4 may be configured to detect a distance between the sensor cable 2 and the object 5 based on the detected variation $\Delta Cs$ since the variation $\Delta Cs$ is a function of the distance between the sensor cable 2 and the object 5. Furthermore, the arithmetic unit 4 may determine that the object 5 such as a part of human body is in contact with the sensor cable 2 when the variation $\Delta Cs$ of the capacitance Cs exceeds the preset approach determination threshold since the variation $\Delta Cs$ of the capacitance Cs is maximized when the object 5 such as a part of human body is in contact with the sensor cable 2.

Next, the pressure detection will be described. In general, capacitance C between two parallel conductors is given by the following formula (1):

$$C = (\pi \varepsilon) / \{\log(d/a)\} \quad (1)$$

where d is a distance between conductors, a is a conductor diameter, and $\varepsilon$ is a dielectric constant between conductors.

As an example, the sensor cable 2 is pressed by an external force and the insulation 22 is deformed as shown in FIG. 4. In this case, as compared to when the insulation 22 is not deformed (the state shown in FIG. 1B), the capacitance C1 increases due to reduction in the distance between the first electrode wire 21a and the second electrode wire 21b, and the capacitance C2 also increases due to reduction in the distance between the first electrode wire 21a and the third electrode wire 21c. The distance between the second electrode wire 21b and the third electrode wire 21c does not change and the capacitance C3 thus does not change.

Thus, in the present embodiment, the arithmetic unit 4 is configured to determine whether or not the sensor cable 2 is pressed, based on comparison between $\Delta C$ obtained from the following formula (2) and a preset depressing pressure determination threshold.

$$\Delta C = (C1 + C2) - 2 \times C3 \quad (2)$$

The arithmetic unit 4 determines that the sensor cable 2 is pressed when e.g., the absolute value of ΔC obtained from the formula (2) exceeds the pressure determination threshold.

ΔC obtained from the formula (2) is a value corresponding to a stress applied to the sensor cable 2. Thus, the arithmetic unit 4 may be configured to calculate a stress applied to the sensor cable 2 based on ΔC, in addition to detect whether or not the sensor cable 2 is pressed.

Exemplary Application of the Composite Detection Sensor 1

Figure 5:
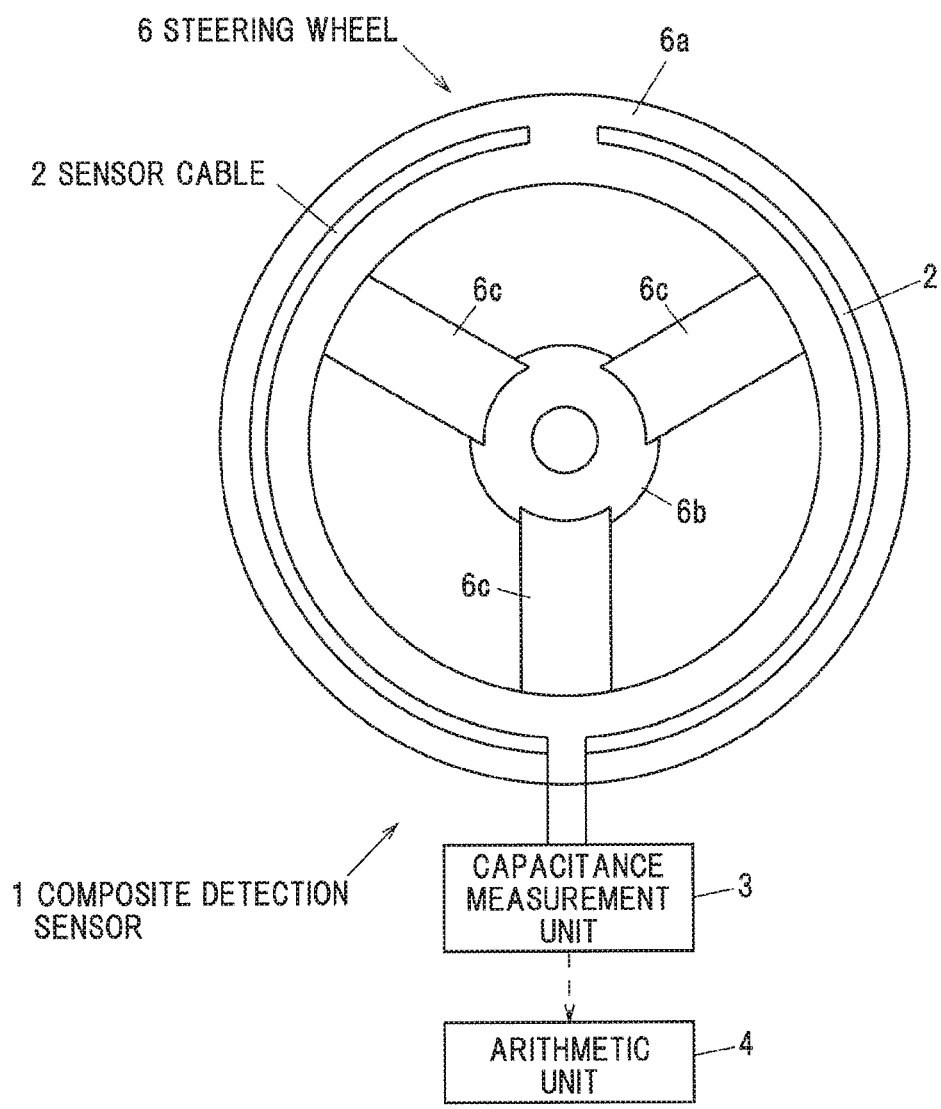
FIG. 5 is an explanatory diagram illustrating an example of an application of the composite detection sensor.

The composite detection sensor 1 in the present embodiment is attached to, e.g., an automobile steering wheel 6 as shown in FIG. 5 and is used as a switch device mounted on the steering wheel 6 and also as a sensor for detecting whether or not a driver is gripping the steering wheel 6.

The steering wheel 6 has a steering wheel main body 6a having a substantially annular shape, a coupling portion 6b arranged on the center axis of the steering wheel main body 6a and coupled to an end portion of a steering shaft (not shown), and spoke portions 6c provided between the steering wheel main body 6a and the coupling portion 6b.

The sensor cables 2 are arranged along the surface of the steering wheel main body 6a. Although an example in which the sensor cables 2 are arranged on the surface of the steering wheel main body 6a is shown here, the sensor cables 2 may be embedded in the steering wheel main body 6a.

In addition, in this example, two sensor cables 2 are used such that one of the sensor cables 2 is arranged along the surface of the left half of the steering wheel main body 6a and the other sensor cable 2 is arranged along the surface of the right half of the steering wheel main body 6a. The left half and the right half here mean a left portion and a right portion with respect to the center axis between right and left when the steering wheel 6 is located at a reference position (straight-ahead position). However, the arrangement is not limited to the example shown in the drawing. For example, it is possible to arrange one sensor cable 2 along the substantially entire circumference of the steering wheel main body 6a.

The composite detection sensor 1 can detect whether or not a driver is gripping the steering wheel 6 based on the approach detection (including contact detection) conducted by the arithmetic unit 4. Thus, when it is detected that, e.g., the driver has not gripped the steering wheel 6 for a predetermined period of time or more during when the vehicle is in motion, it is possible to, e.g., give audible warning to the driver.

In addition, the pressure detection conducted by the arithmetic unit 4 allows the composite detection sensor 1 to be used as a switch device for the steering wheel 6. As a result, various operations can be allocated in such a manner that the audio sound volume is increased by pressing one of the sensor cables 2 and is reduced by pressing the other sensor cable 2.

Functions and Effects of the Embodiment

As described above, the composite detection sensor 1 in the present embodiment is provided with the sensor cable 2 having not less than three conductive electrode wires 21 and the resilient insulation 22 covering collectively the not less than three electrode wires 21 and holding the circumferentially-spaced electrode wires 21, and the capacitance measurement unit 3 for measuring capacitance between each two electrode wires 21 and capacitance between each electrode wire 21 and the ground.

Since the linear sensor cable 2 is used in the composite detection sensor 1, the composite detection sensor 1 can be easily applied to a curved portion such as the steering wheel 6 as compared to the conventional technique using plate-shaped electrodes, and it is possible to realize the composite detection sensor 1 with high versatility.

Summary of Embodiments

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A composite detection sensor (1), comprising: a sensor cable (2) comprising not less than three conductive electrode wires (21) and a resilient insulation (22) covering collectively the not less than three electrode wires (21) and holding the electrode wires (21) that are circumferentially spaced from each other; and a capacitance measurement unit (3) for measuring capacitance between each two electrode wires (21) and between at least one of the electrode wires (21) and the ground.

[2] The composite detection sensor (1) defined by [1], wherein the capacitance measurement unit (3) comprises: a plurality of inter-wire capacitance measuring portions (31) for measuring capacitance between the electrode wires (21); a wire-ground capacitance measuring portion (32) for measuring capacitance between the electrode wires (21) and the ground; and a switching means (33) switchable between a first connection state and a second connection state, the first connection state being a state in which the electrode wires (21) are connected to the inter-wire capacitance measuring portions (31), and the second connection state being a state in which the electrode wires (21) are connected to the wire-ground capacitance measuring portion (32).

[3] The composite detection sensor (1) defined by [2], wherein the capacitance measurement unit (3) comprises a control unit (34) for controlling the switching means (33), and wherein the control unit (34) switches between the first connection state and the second connection state for every predetermined time.

[4] The composite detection sensor (1) defined by [3], wherein the predetermined time for switching between the first connection state and the second connection state by the control unit (34) is less than 1 second.

[5] The composite detection sensor (1) defined by any one of [2] to [4], wherein the switching means (33) is configured such that all of the electrode wires (21) are collectively connected to the wire-ground capacitance measuring portion (32) when switched to the second connection state, so that the wire-ground capacitance measuring portion (32) measures capacitance between all the electrode wires (21) and the ground.

[6] The composite detection sensor (1) defined by any one of [1] to [5], wherein the three electrode wires (21) comprise a first electrode wire (21a), a second electrode wire (21b) and a third electrode wire (21c), and wherein the composite detection sensor (1) further comprises an arithmetic unit (4) that determines whether or not the sensor cable (2) is pressed, the arithmetic unit (4) making the determination by comparing ΔC obtained from the following formula (1) with a predetermined threshold value, $$\Delta C = (C1+C2) - 2 \times C3 \quad (1)$$

based on capacitance C1 between the first electrode wire (21a) and the second electrode wire (21b), capacitance C2 between the first electrode wire (21a) and the third electrode wire (21c), and capacitance C3 between the second electrode wire (21b) and the third electrode wire (21c).

[7] The composite detection sensor (1) defined by any one of [1] to [6], wherein the insulation (22) comprises a hollow portion (23) and is formed in a hollow cylindrical shape.

[8] The composite detection sensor (1) defined by any one of [1] to [6], wherein the insulation (22) comprises a first insulation (22a) having a linear shape and a second insulation (22b) covering the outer surface of the first insulation (22a) and having a higher rigidity than the first insulation (22a).

[9] The composite detection sensor (1) defined by any one of [1] to [8], wherein the electrode wires (21) are arranged in a helical manner along the longitudinal direction of the sensor cable (2).

[10] A sensor cable (2), comprising: not less than three conductive electrode wires (21); and a resilient insulation (22) covering collectively the not less than three electrode wires (21) and holding the electrode wires (21) that are circumferentially spaced from each other, wherein no outer conductor is provided around the electrode wires (21).

Although the embodiment of the invention has been described, the invention according to claims is not to be limited to the embodiment. Further, please note that all combinations of the features described in the embodiment are not necessary to solve the problem of the invention.

The invention can be appropriately modified and implemented without departing from the gist of the invention.

What is claimed is:

1. A composite detection sensor, comprising:
   a sensor cable comprising not less than three conductive electrode wires and a resilient insulation covering collectively the not less than three electrode wires and holding the electrode wires that are circumferentially spaced from each other; and
   a capacitance measurement unit for measuring capacitance between each two electrode wires and between at least one of the electrode wires and the ground,
   wherein the three electrode wires comprise a first electrode wire, a second electrode wire and a third electrode wire, and
   wherein the composite detection sensor further comprises an arithmetic unit that determines whether or not the sensor cable is pressed, the arithmetic unit making the determination by comparing ΔC obtained from the following formula (1) with a predetermined threshold value, $$\Delta C = (C1+C2) - 2 \times C3 \quad (1)$$

based on capacitance C1 between the first electrode wire and the second electrode wire, capacitance C2 between the first electrode wire and the third electrode wire, and capacitance C3 between the second electrode wire and the third electrode wire.

2. The composite detection sensor according to claim 1, wherein the capacitance measurement unit comprises:
   a plurality of inter-wire capacitance measuring portions for measuring capacitance between the electrode wires;
   a wire-ground capacitance measuring portion for measuring capacitance between the electrode wires and the ground; and
   switching means switchable between a first connection state and a second connection state, the first connection state being a state in which the electrode wires are connected to the inter-wire capacitance measuring portions, and the second connection state being a state in which the electrode wires are connected to the wire-ground capacitance measuring portion.

3. The composite detection sensor according to claim 2, wherein the capacitance measurement unit comprises a control unit for controlling the switching means, and wherein the control unit switches between the first connection state and the second connection state for every predetermined time.

4. The composite detection sensor according to claim 2, wherein the three electrode wires comprise a first electrode wire, a second electrode wire and a third electrode wire, and
   wherein the composite detection sensor further comprises an arithmetic unit that determines whether or not the sensor cable is pressed, the arithmetic unit making the determination by comparing ΔC obtained from the following formula (1) with a predetermined threshold value, $$\Delta C = (C1+C2) - 2 \times C3 \quad (1)$$

based on capacitance C1 between the first electrode wire and the second electrode wire, capacitance C2 between the first electrode wire and the third electrode wire, and capacitance C3 between the second electrode wire and the third electrode wire.

5. The composite detection sensor according to claim 3, wherein the predetermined time for switching between the first connection state and the second connection state by the control unit is less than 1 second.

6. The composite detection sensor according to claim 3, wherein the switching means is configured such that all of the electrode wires are collectively connected to the wire-ground capacitance measuring portion when switched to the second connection state, so that the wire-ground capacitance measuring portion measures capacitance between all the electrode wires and the ground.

7. The composite detection sensor according to claim 3, wherein the three electrode wires comprise a first electrode wire, a second electrode wire and a third electrode wire, and
   wherein the composite detection sensor further comprises an arithmetic unit that determines whether or not the sensor cable is pressed, the arithmetic unit making the determination by comparing ΔC obtained from the following formula (1) with a predetermined threshold value, $$\Delta C = (C1+C2) - 2 \times C3 \quad (1)$$

based on capacitance C1 between the first electrode wire and the second electrode wire, capacitance C2 between the first electrode wire and the third electrode wire, and capacitance C3 between the second electrode wire and the third electrode wire.

8. The composite detection sensor according to claim 5, wherein the switching means is configured such that all of the electrode wires are collectively connected to the wire-ground capacitance measuring portion when switched to the second connection state, so that the wire-ground capacitance measuring portion measures capacitance between all the electrode wires and the ground.

9. The composite detection sensor according to claim 5, wherein the three electrode wires comprise a first electrode wire, a second electrode wire and a third electrode wire, and
   wherein the composite detection sensor further comprises an arithmetic unit that determines whether or not the sensor cable is pressed, the arithmetic unit making the determination by comparing ΔC obtained from the following formula (1) with a predetermined threshold value, $$\Delta C = (C1 + C2) - 2 \times C3 \tag{1}$$

based on capacitance C1 between the first electrode wire and the second electrode wire, capacitance C2 between the first electrode wire and the third electrode wire, and capacitance C3 between the second electrode wire and the third electrode wire.

10. The composite detection sensor according to claim 1, wherein the insulation comprises a hollow portion and is formed in a hollow cylindrical shape.

11. The composite detection sensor according to claim 1, wherein the insulation comprises a first insulation having a linear shape and a second insulation covering the outer surface of the first insulation and having a higher rigidity than the first insulation.

12. The composite detection sensor according to claim 1, wherein the electrode wires are arranged in a helical manner along the longitudinal direction of the sensor cable.

13. A composite detection sensor, comprising:
  a sensor cable comprising not less than three conductive electrode wires and a resilient insulation covering collectively the not less than three electrode wires and holding the electrode wires that are circumferentially spaced from each other; and
  a capacitance measurement unit for measuring capacitance between each two electrode wires and between at least one of the electrode wires and the ground,
  wherein the capacitance measurement unit comprises:
    a plurality of inter-wire capacitance measuring portions for measuring capacitance between the electrode wires;
    a wire-ground capacitance measuring portion for measuring capacitance between the electrode wires and the ground; and
    switching means switchable between a first connection state and a second connection state, the first connection state being a state in which the electrode wires are connected to the inter-wire capacitance measuring portions, and the second connection state being a state in which the electrode wires are connected to the wire-ground capacitance measuring portion, and
  wherein the switching means is configured such that all of the electrode wires are collectively connected to the wire-ground capacitance measuring portion when switched to the second connection state, so that the wire-ground capacitance measuring portion measures capacitance between all the electrode wires and the ground.

14. The composite detection sensor according to claim 13, wherein the three electrode wires comprise a first electrode wire, a second electrode wire and a third electrode wire, and
  wherein the composite detection sensor further comprises an arithmetic unit that determines whether or not the sensor cable is pressed, the arithmetic unit making the determination by comparing ΔC obtained from the following formula (1) with a predetermined threshold value, $$\Delta C = (C1 + C2) - 2 \times C3 \tag{1}$$

based on capacitance C1 between the first electrode wire and the second electrode wire, capacitance C2 between the first electrode wire and the third electrode wire, and capacitance C3 between the second electrode wire and the third electrode wire.

* * * * *